United States Patent
Ono

(10) Patent No.: US 7,573,886 B1
(45) Date of Patent: Aug. 11, 2009

(54) SYSTEM AND METHOD FOR ADAPTIVE BANDWIDTH DETERMINATION

(75) Inventor: Tarik Ono, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 971 days.

(21) Appl. No.: 10/886,075

(22) Filed: Jul. 6, 2004

(51) Int. Cl.
H04L 12/28 (2006.01)

(52) U.S. Cl. ............... 370/395.2; 370/352; 370/429; 370/477; 709/200; 709/233; 714/4

(58) Field of Classification Search ......... 370/231, 370/249, 252, 352, 395.2, 429, 477; 375/240.02; 709/233, 200; 714/4
See application file for complete search history.

(56) References Cited

U.S. PATENT DOCUMENTS

| | | | | |
|---|---|---|---|---|
| 5,477,531 | A * | 12/1995 | McKee et al. | 370/249 |
| 6,519,257 | B1 * | 2/2003 | Brueckheimer et al. | 370/395.2 |
| 6,757,255 | B1 * | 6/2004 | Aoki et al. | 370/252 |
| 6,769,030 | B1 * | 7/2004 | Bournas | 709/233 |
| 7,012,893 | B2 * | 3/2006 | Bahadiroglu | 370/231 |
| 7,016,409 | B2 * | 3/2006 | Unger | 375/240.02 |
| 7,058,843 | B2 * | 6/2006 | Wolf | 714/4 |
| 7,310,682 | B2 * | 12/2007 | Hatime | 709/233 |
| 7,339,953 | B2 * | 3/2008 | Widmer et al. | 370/477 |
| 7,346,063 | B1 * | 3/2008 | Herbst | 370/395.7 |
| 7,362,771 | B1 * | 4/2008 | Lo et al. | 370/429 |
| 2001/0029520 | A1 * | 10/2001 | Miyazaki et al. | 709/200 |
| 2006/0114315 | A1 * | 6/2006 | Crook | 348/14.08 |
| 2006/0116578 | A1 * | 6/2006 | Grunwald et al. | 600/440 |

OTHER PUBLICATIONS

Mike Oliver, Raja Doraisamy, Bob Doolittle, Kent Peacock, Gerard Wall and Gary Sloane, "SunRay Deployment on Shared Networks", Sun BluePrints Online, Feb. 2004, pp. 1-28.

* cited by examiner

Primary Examiner—Gerald Gauthier
(74) Attorney, Agent, or Firm—Martine Penilla & Gencarella, LLP

(57) ABSTRACT

A method of determining effective bandwidth includes selecting a first packet size and sending a first packet having the first packet size from a first node to a second node. A confirmation that the first packet was received in the second node is received. A transfer time of the first packet is recorded. A second packet size is selected and a second packet having the second packet size is sent from the first node to the second node. A confirmation that the second packet was received in the second node is received and a transfer time of the second packet is recorded. An effective bandwidth between the first node and the second node is calculated and the effective bandwidth can be output.

21 Claims, 4 Drawing Sheets

SYSTEM AND METHOD FOR ADAPTIVE BANDWIDTH DETERMINATION

BACKGROUND OF THE INVENTION

1. Field of the Invention

The present invention relates generally to computer networks, and more particularly, to methods and systems for dynamically determining effective bandwidth in a computer network.

2. Description of the Related Art

Communication networks for providing digital communication links have become very commonplace. Such communication networks can be found in telephone and other wired and wireless communication systems and can link multiple computers (e.g., LAN, WAN, Internet, etc.). One of the many common aspects of these different communication networks is that the available bandwidth (i.e., effective data throughput) is limited by many factors. These limiting factors include, among others, network design, throughput on each of the applicable network connections between any two nodes (links), length of each link, number of client nodes and server nodes on the network, and the respective data demands for each node.

FIG. 1 is a block diagram of a typical computer network 100. The computer network 100 includes one or more server computers 120A-n and one or more client computers 110A-n. The server computers 120A-n and the client computers 110A-n are connected via network connections (links) 102, 104A-n and 106A-n. Each of the links 102, 104A-n and 106A-n can include one or more of a cable (i.e., hardwired, coax, twisted-pair, etc.), a wireless (e.g., microwave, IEEE 802.11, Bluetooth, wireless LAN, etc.) and any other type of data connection links.

Often the effective bandwidth is significantly less than the maximum capabilities of the links 102, 104A-n and 106A-n. By way of example, the links 102, 104A and 106A can have a 10 Gbit theoretical data throughput capability. However, the actual effective bandwidth between client 110A and server 120A is typically significantly less than 10 Gbit due to additional data traffic to or from nodes other than client 110A and server 120A being transmitted across links 102 and 106A. By way of example, the additional data being transmitted across links 102 and 106A can include data demands from clients 110B-110$n$ on the server 120A. The actual effective bandwidth between client 110A and server 120A can also be limited by network overhead requirements (e.g., packet and routing information).

When a computer network is installed or constructed the computer network is tested to determine a "typical bandwidth" that is a static measurement of the effective bandwidth that should typically be available to the various nodes on the network. The network nodes can then predictably expect the typical bandwidth to be available for their respective uses. Unfortunately, the actual available bandwidth (effective bandwidth) can vary considerably due to various dynamic conditions of the network. The dynamic conditions of the network can include, for example, the data transmission demands across each of the links 102, 104A-n and 106A-n. The applications 115A-n and 125A-n operating on the various clients 110A-n and servers 120A-n can also cause the effective bandwidth to vary substantially higher and lower than the typical bandwidth measurement. The actual physical routing of each of the links 102, 104A-n and 106A-n can also change dynamically. By way of example, route of link 106A, 102 and 104A between nodes 120A and 110A can initially be routed through a first set of routers. As the traffic demands or other availability issues impact one of the first set of routers, a second set of routers may be used to maintain the link 106A, 102 and 104A between nodes 120A and 110A. As the routing changes, the bandwidth may also change.

By way of example, a very high bandwidth may be needed between client 110A and server 120$n$ to support a streaming media being delivered from application 125$n$ to application 115A. At the same time a relatively small bandwidth is needed by a database search application 115$n$ running on client computer 110$n$ and searching a database 125A on server 120A. Conversely, application 115B can also be a high bandwidth demand application. In a typical network, the high bandwidth demands by applications 115A and 115B are each set to use the total typically available bandwidth. However, when both applications 115A and 115B require high bandwidth demands, then the total typically available bandwidth cannot be dedicated to both applications. Therefore, one or more of the applications 115A-n and 125A-n cannot operate in an optimized mode. As a result, data transfers between the respective nodes may be delayed and data packets may be lost, requiring replacement data packets to be sent consuming even more of the bandwidth.

In view of the foregoing, there is a need for a system and method for dynamically determining effective bandwidth, in real time (or near real time) as the effective bandwidth varies.

SUMMARY OF THE INVENTION

Broadly speaking, the present invention fills these needs by providing a system and method for dynamically determining actual effective bandwidth, in a communication network, as the effective bandwidth varies. It should be appreciated that the present invention can be implemented in numerous ways, including as a process, an apparatus, a system, computer readable media, or a device. Several inventive embodiments of the present invention are described below.

One embodiment provides a method of determining effective bandwidth that includes selecting a first packet size and sending a first packet having the first packet size from a first node to a second node. A confirmation that the first packet was received in the second node is received. A transfer time of the first packet is recorded. A second packet size is selected and a second packet having the second packet size is sent from the first node to the second node. A confirmation that the second packet was received in the second node is received and a transfer time of the second packet is recorded. An effective bandwidth between the first node and the second node is calculated and the effective bandwidth can be output.

The method can also include determining if additional packet sizes are to be sent. If additional packet sizes are to be sent, then a subsequent packet size is selected and a subsequent packet of the subsequent packet size is sent from the first node to the second node. A confirmation is received that the subsequent packet was received in the second node and a transfer time of the subsequent packet is recorded. The method can also include determining if an additional cycle of selecting packet sizes and sending packets of the selected size are required. Each cycle can include selecting the first packet size and sending a third packet of the first size from the first node to the second node. A confirmation is received that confirms that the third packet was received in the second node and a transfer time of the third packet is recorded and then it can be determined if additional packet sizes are to be sent.

A number (N) of cycles can be constant or variable. N can be a small value for a start-up effective bandwidth and then N can be increased to a larger value. N can also be reduced until a correlation is equal to or less than a preselected correlation level. Alternatively, N can be increased until a correlation is equal to or greater than a preselected correlation level.

Calculating the effective bandwidth between the first node and the second node can include forming a line defined by a selected transfer time for each packet size and determining a slope of the line. The effective bandwidth is equal to an inverse of the slope of the line. The line can be determined using a linear least squares progression.

The method can further include, determining an accuracy of the line. Determining the accuracy of the line can include determining if a correlation between the selected packet sizes and the recorded transfer times corresponding to each of the selected packet sizes is equal to or greater than a preselected correlation level. If the correlation between the selected packet sizes and the recorded transfer times corresponding to each of the selected packet sizes is less than the preselected correlation level, then an additional cycle is needed. Conversely, if the correlation between the selected packet sizes and the recorded transfer times corresponding to each of the selected packet sizes is less than the preselected correlation level, then the effective bandwidth measurement can be restarted.

The effective bandwidth can also be determined in a repetitive, on-going manner so as to detect any changes in a current effective bandwidth at any given time.

Outputting the effective bandwidth can include receiving the effective bandwidth in an application on a third node. The application can modify at least one operation according to the effective bandwidth.

Another embodiment provides an optimized method of determining effective bandwidth in a communication network. The method includes selecting at least two packet sizes from a set of packet sizes. Selecting each one of the at least two packet sizes can include sending a packet of the selected size from a first node to a second node. A confirmation is received that confirms that the packet was received in the second node. A transfer time of the packet is recorded. If additional packet sizes are needed to be sent then a subsequent packet size is selected and a cycle count is incremented. Alternatively, if additional packet sizes are not to be sent, then the cycle count is analyzed to determine if the cycle count is equal to N. If the cycle count is not equal to N then select the first packet size. If the number of cycles is equal to N, then the effective bandwidth between the first node and the second node is calculated and an optimum N value is determined.

Determining the optimum N value can include determining if the transfer time has a correlation equal to a preselected level. If the transfer time has a correlation equal to the preselected level then decrementing N and selecting the first packet size. Alternatively, if the transfer time has a correlation less than the preselected level then incrementing N and selecting the first packet size. Determining the optimum N value can also include outputting a minimum N value where the transfer time has a correlation equal to the preselected level.

Yet another embodiment provides a method of transferring data across a communication network. The method includes measuring a current effective bandwidth between a first node and a second node in the communication network. The current effective bandwidth is determined to be equal to a first effective bandwidth. Data is sent at a rate substantially equal to the first effective bandwidth. The current effective bandwidth is determined to have changed and is equal to a second effective bandwidth. Data can be sent at a rate substantially equal to the second effective bandwidth. Sending data at a rate substantially equal to the second effective bandwidth includes changing at least one aspect of an application that is sending data.

Still another embodiment provides a system for determining effective bandwidth. The system includes a first node and a second node, the second node being coupled to the first node by a communication network. The first node includes logic for selecting a first packet size and logic for sending a first packet of the selected size from the first node to the second node. The first node also includes logic for receiving a confirmation that the first packet was received in the second node and logic for recording a transfer time of the first packet. The first node also includes logic for selecting a second packet size and logic for sending a second packet of the selected size from the first node to the second node. The first node also includes logic for receiving a confirmation that the second packet was received in the second node and logic for recording a transfer time of the second packet. The first node also includes logic for calculating an effective bandwidth between the first node and the second node and logic for outputting the effective bandwidth.

The present invention provides the advantage of dynamically monitoring the current effective bandwidth available between two nodes on a communication network. As the current effective bandwidth can be determined then applications communicating between the two nodes can be dynamically optimized make the best use of the effective bandwidth. This can increase the speed at which nodes and applications can communicate with one another and can more efficiently use the resources of the network.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for a system and method for dynamically determining actual effective bandwidth in a communication network, in real time (or near real time), as the effective bandwidth varies, will now be described. It will be apparent to those skilled in the art that the present invention may be practiced without some or all of the specific details set forth herein.

As the computing and communication worlds become ever more interconnected, the demands of the respective nodes (e.g., terminals, clients, servers, routers, etc.) can be managed and optimized to provide the most effective use of the available resources. One important resource available to the nodes on a communication network is the effective data throughput (effective bandwidth) available between one node and any other node. If the near real-time effective bandwidth between a first node and a second node is "known" to at least one of the nodes (i.e., the first node), then the first node can optimize its communication demands with the second node. By way of example, if an effective bandwidth between the first node and the second node is limited to less than 30 kbps, then an application running on the first node can adjust operations for optimum use of the 30 kbps effective bandwidth. Alternatively, if the effective bandwidth between the first node and the second node is limited to less than 300 kbps, then the first node can adjust operations for optimum use of the 300 kbps effective bandwidth.

One example of optimized operation can be as simple as adjusting an expected response time to a data request sent to the second node. A more complex example of an optimized operation can be changing one or more operating methods. By way of example, where media is streaming between a first node and a second node, a lower quality media data stream may be sent if the effective bandwidth is lower (i.e., 30 kbs), where a higher quality media data stream may be sent if the effective bandwidth is higher (i.e., 300 kbps). Alternatively, if the effective bandwidth is lower (i.e., 30 kbps), then the data may be compressed a greater amount. The increased data compression requirement can require additional data-compression processing by the source node and data-decompression processing by the receiving node.

Figure 1:
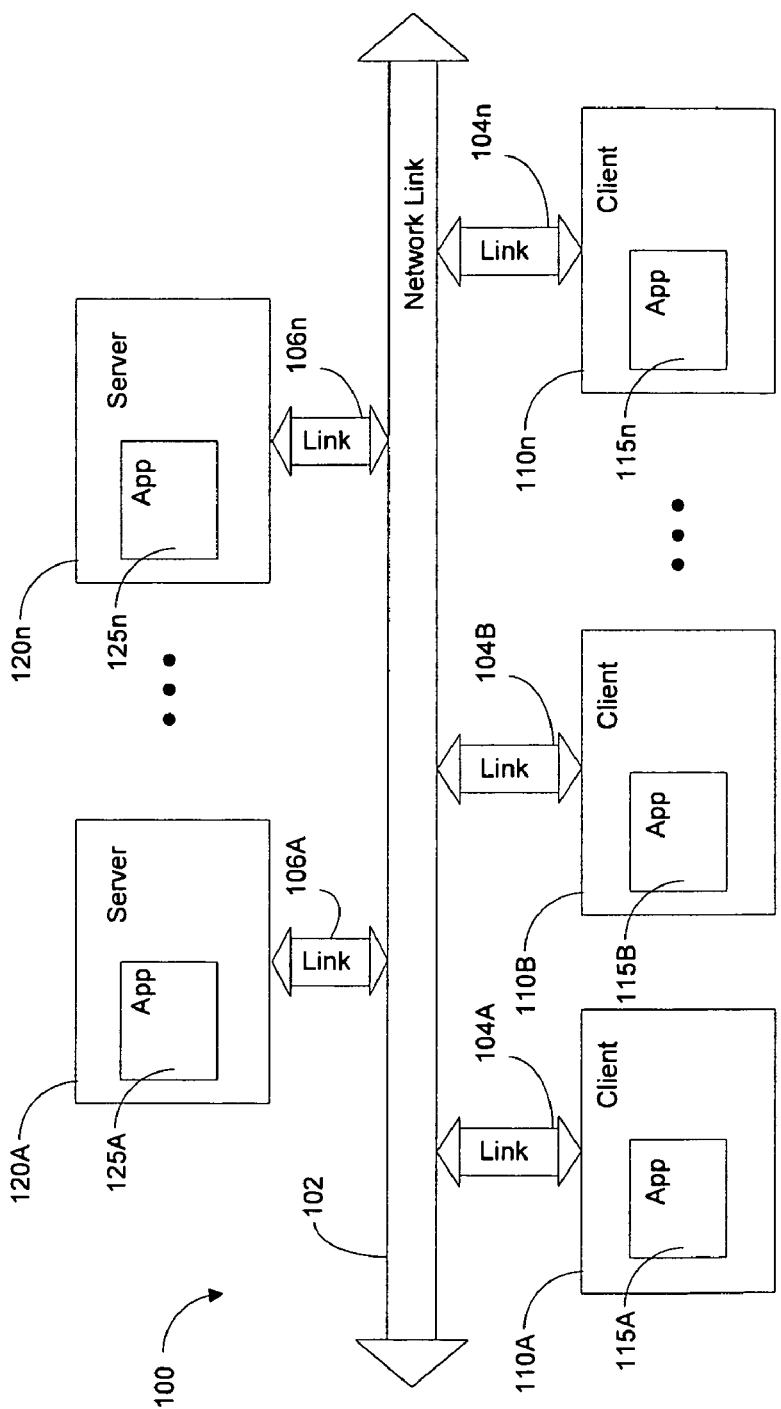
FIG. 1 is a block diagram of a typical computer network.
Figure 2A:
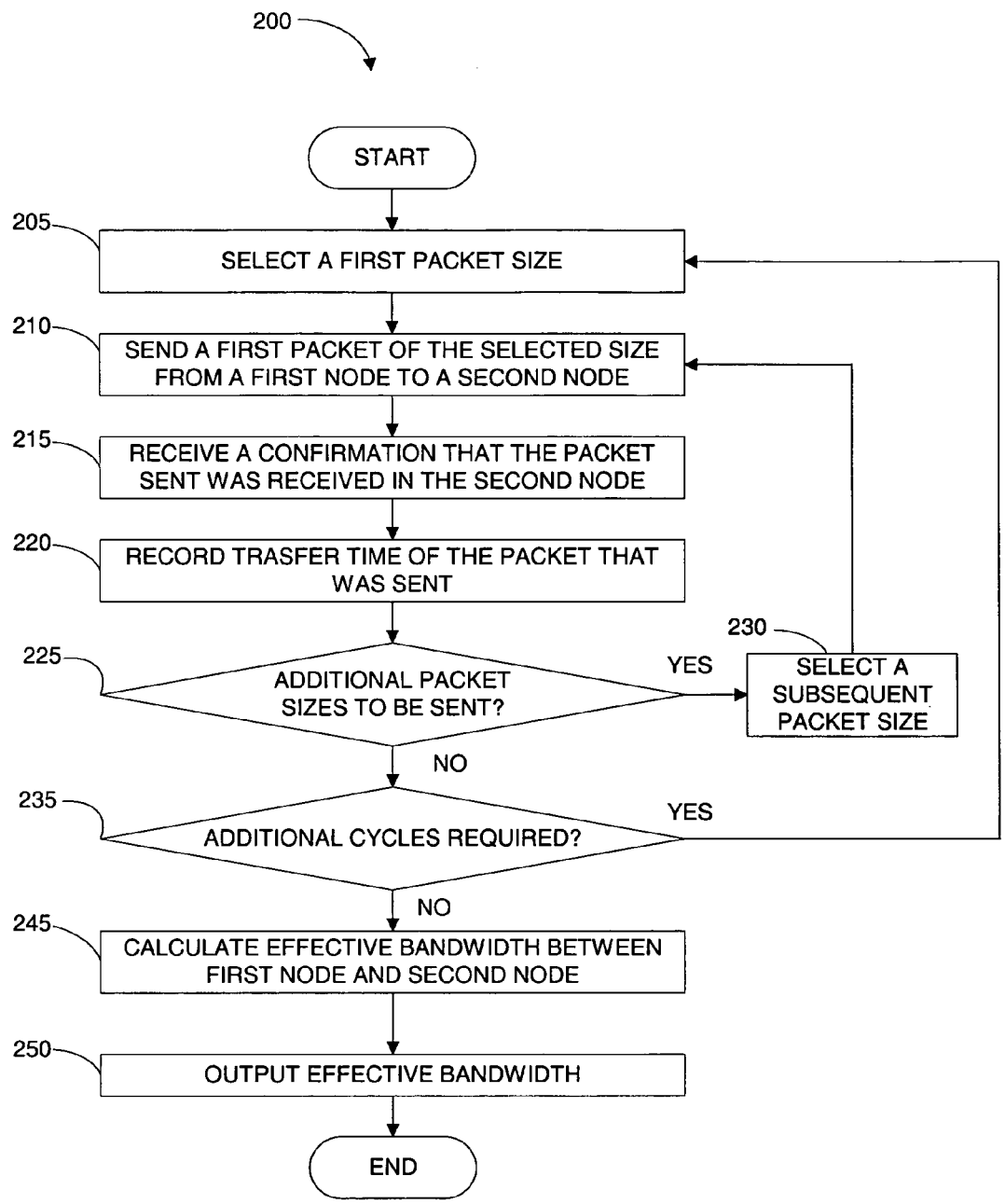
FIG. 2A is a flowchart diagram of the method operations performed in dynamically determining the effective bandwidth in a communication network, in accordance with one embodiment of the present invention.

FIG. 2A is a flowchart diagram of the method operations 200 performed in dynamically determining the effective bandwidth in a communication network, in accordance with one embodiment of the present invention. In an operation 205, a first packet size is selected. Typically several different packet sizes can be used, although at least two different packet sizes are required to provide an accurate measurement of the effective bandwidth.

Figure 2B:
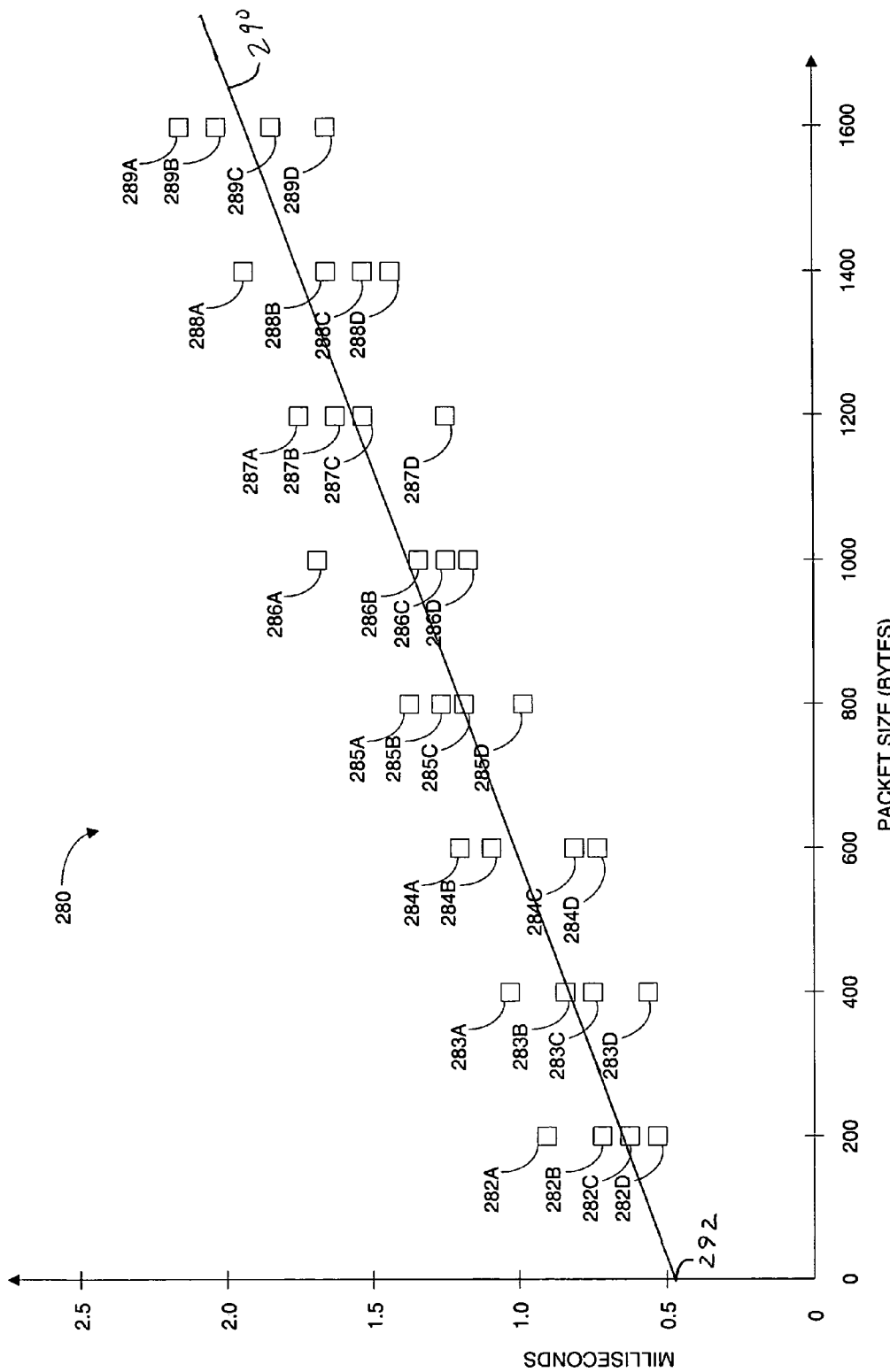
FIG. 2B is a graph of the recorded RTT for several data packets of several sizes transferred between the first node and the second node, in accordance with one embodiment of the present invention.

At least two packet sizes are preferable so that a first portion of the round-trip time that is due to the bandwidth limitations and a second portion of the round-trip time is due to the network delay. By way of example, if a high-speed data link is formed from San Jose, Calif. to Paris, France (approximately 5600 miles), then a relatively long transit time is required for the packet to travel from San Jose to Paris, no matter how large the bandwidth. Similarly, if a similar high-speed link is formed between Santa Clara, Calif. and San Jose, Calif. (approximately 10 miles), then the corresponding transit time will typically be much shorter than the transit time between San Jose and Paris. Sending two different packet sizes will identify the network delay portion and the bandwidth limitations. Referring to FIG. 2B, the network delay is the point 292 where the line 290 intersects the y-axis. This is the theoretical delay of a zero byte-sized packet.

The different sizes of packets can be within a range of between a minimum packet size for the network (i.e., about 2 bytes) and a maximum packet size for the network. By way of example in a typical Ethernet network has a maximum packet size of about 1500 bytes. However, it should be understood that other network protocols may have larger or smaller minimum and maximum packet sizes. If larger or smaller packet sizes were to be transferred across the network being tested, then the larger or smaller packet sizes can be used. Several different packet sizes are used so that the transfer time required for each different packet size can be determined.

Any one of the multiple packet sizes can be selected in operation 205. The first packet size selected can be a predetermined selection (e.g., the smallest, the largest, etc.) or can be any one of the multiple packet sizes available. It will be apparent to those skilled in the art that other methods of selecting one of the multiple packet sizes also can be used. The selected packet size can also be an approximate size or a pre-selected range of sizes. By way of example, if the selected packet size is 200 bytes, then the actual packets can be within a range of 190 and 210 bytes.

In an operation 210, a packet of the selected size is sent from a first node to a second node. The sent packet can be a packet that is specifically generated for the effective bandwidth test (i.e., a test packet) or can be selected from a data stream of packets already being sent from the first node to the second node. By way of example, the effective bandwidth application can be monitoring a first application that is operating on the first node. The first application sends data packets to a second application running on the second node. The effective bandwidth application can then select one of the data packets having the selected size, from the data packets being sent from the first application to the second application.

In an operation 215, a confirmation is received in the first node from the second node. The confirmation confirms receipt of the packet by the second node. In an operation 220, the round-trip-time (RTT) (i.e., transfer time) is recorded. The RTT is the elapsed time from when the packet was sent from the first node to when the confirmation was received in the first node. In an alternative embodiment, the recorded time could also be RTT/2. RTT/2 approximates the time the packet required to travel from the first node to the second node. FIG. 2B shows exemplary recorded RTT for multiple packets.

Referring again to FIG. 2A, in an operation 225, it is determined if additional sizes of packets need to be sent. If additional sizes of packets need to be sent, then the method operations continue in an operation 230. In operation 230, a subsequent packet size is selected and the method operations continue as described above in operation 210. Typically two or more packet sizes are used to provide sufficient information to measure the effective bandwidth. However, more than two packet sizes can also be used.

If, in operation 225, no additional sizes of packets need to be sent, then the method operations continue in an operation 235. In operation 235, it is determined if additional cycles of sending packets of varying sizes (i.e., operations 205-230 above) need to be executed. If additional cycles need to be executed, then the method operations continue in operation 205.

Typically a number "N" cycles of operations 205-230 above are executed. The magnitude of N is determined by many factors. As the magnitude of N is increased, the total time required to complete the full effective bandwidth evaluation also increases. The time required to complete the full effective bandwidth evaluation (i.e., "N" cycles of operations 205-230) can be determined from the following formula:

$$(N)*(Td)*(Sp)+(RTT_L) = \text{time required to complete } N \text{ cycles}$$

Where:
N is the number of cycles
Td is equal to the time delay between each packet
Sp is equal to the number of packet sizes used
$RTT_L$ is the round trip time of the last packet sent.

The round trip time of the last packet sent ($RTT_L$) is added as the last confirmation of the last packet sent will not be received until the $RTT_L$ after the last packet was sent. Presumably, all confirmations of previously sent packets will be received before the confirmation of the last packet is received. By way of example, if 1.5 msec transfer time is required for each packet, only two packet sizes are used, and packets are sent every 5 msec, then for an N=10, then the total time required to complete one cycle is:

$$(10)*(5)*(2)+(RTT_L)=100 \text{ msec}+(RTT_L).$$

However, often three or more packet sizes are used. Therefore the total time required to complete one cycle for three packet sizes is:

$$(10)*(5)*(3)+(RTT_L)=150 \text{ msec}+(RTT_L).$$

Further, ten or more different packet sizes are often used. Therefore, the total time required to complete one cycle for ten packet sizes is:

$$(10)*(5)*(10)+(RTT_L)=500 \text{ msec}+(RTT_L).$$

As will be shown in more detail below, as the magnitude of N is increased, the accuracy of each cycle of the effective bandwidth evaluation is also increased. Similarly, as the number of different packet sizes selected increases, the accuracy and time requirements increase. Conversely, as N decreases and/or the number of different packet sizes selected decreases, both the accuracy and time requirements decrease.

Referring again to FIG. 2A, if in operation 235, no additional cycles of sending packets of varying sizes (i.e., operations 205-230 above) are required, then the method operations continue in an operation 245. In operation 245, the effective bandwidth between the first node and the second node is calculated.

In an operation 250, the effective bandwidth can be output and the method operations can end. Alternatively, the method operations 200 can repeat, beginning at operation 205 as described above. The method operations 200 can also repeat after a time delay or in response to some other external or internal timing or an initiation trigger.

By way of example, a first application running on the first node may send data in one or more time-delayed bursts. Alternatively, the first application may send data in response to a request from the second node. The effective bandwidth can be determined prior to each of the bursts of data from the first node. Once the first application has been notified of the then current effective bandwidth, then the first application can dynamically adjust operations to most effectively use the current effective bandwidth. In another example, a streaming video application is running on the first node and serving the streaming video to the second node. In a first time interval, before a first set of data packets are sent to the second node, the effective bandwidth between the first and second nodes is determined to be 30 kbps. The first application therefore enables a highly CPU intensive data compression algorithm to compress the video data stream. At some later time interval, the effective bandwidth between the first and second nodes is determined to be 1 Gbps. In response, the first application begins sending the video data stream with no compression, thereby relieving both nodes from any compression/decompression processing of the data stream. It should be understood that the bandwidth could be determined at the same time that the application is sending data. The bandwidth can be determined using the data packets sent by the application (i.e., the streaming video application on the first node).

The method operations 200 (as described in FIG. 2A above) for determining the effective bandwidth can be part of the first application running on the first node. Alternatively the method operations 200 can be an independent application running on any one or more of the first node, the second node or on a third node.

FIG. 2B is a graph 280 of the recorded RTT for several data packets of several sizes transferred between the first node and the second node, in accordance with one embodiment of the present invention. The graph 280 includes data points for 32 packets 282A-289D sent for a single effective bandwidth cycle as described in FIG. 2A. The 32 packets 282A-289D includes four packets (i.e., N=4) of each of the eight different packet sizes 200 bytes, 400 bytes, 600 bytes, 800 bytes, 1000 bytes, 1200 bytes, 1400 bytes and 1600 bytes. While only four packets (i.e., N=4) at each of the eight packet sizes are shown, it should be understood that more or fewer packets at each packet size could be used (i.e., N>4 or N<4).

While only eight different packet sizes are shown being used in the graph 280, it should be understood that more or less than eight different packet sizes could be used. By way of example, the packet sizes can be each of 50 byte intervals between 0 bytes and 1600 bytes rather than the 200 byte intervals shown in FIG. 2B.

The RTT of the 32 packets 282A-289D is shown on the vertical axis of the graph 280. By way of example, packet 285B has a size of 800 bytes and an RTT of about 1.25 msec. This indicates the about 1.25 msec elapsed from when 800 byte packet 285B was sent from the first node to when the confirmation was received in the first node. The second node sent the confirmation when the second node received packet 285B.

Figure 3:
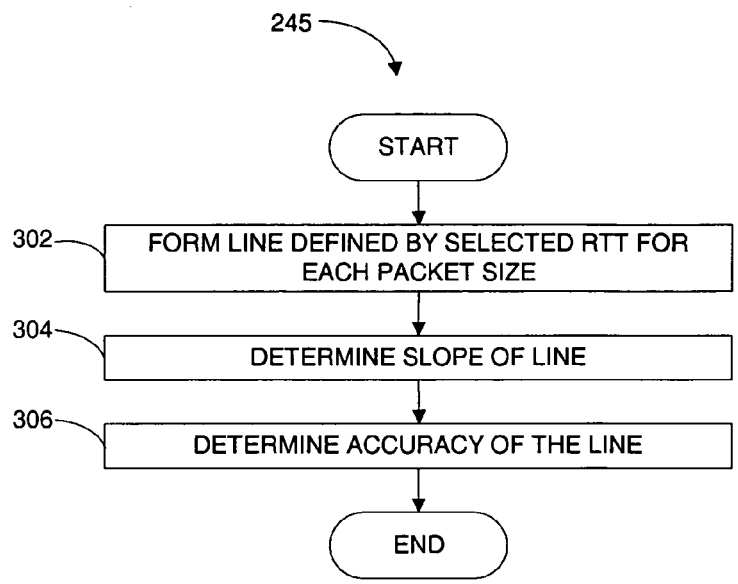
FIG. 3 is a flowchart of the method operations of calculating effective bandwidth, in accordance with one embodiment of the present invention.

FIG. 3 is a flowchart of the method operations 245 of calculating effective bandwidth, in accordance with one embodiment of the present invention. In an operation 302 a line 290 (as shown in graph 280 as described in FIG. 2B) is defined by the recorded 32 data points that correspond to the transfer times for the 32 packets 282A-289D. The line 290 can be determined by selecting a representative RTT (e.g., minimum RTT, average RTT, maximum RTT, mean RTT, etc.) measured for each packet size. A linear regression is then used to determine a functional relationship between the selected RTT values and the packet sizes. The relationship can be shown as the line 290.

In an operation 304, a slope of the line 290 can be determined. The node-to-node bandwidth is equal to the inverse of the slope (i.e., 1/slope) of the line 290.

In an operation 306, the line 290 is evaluated to determine how accurately the line 290 describes the 32 data points 282A-289D. An evaluation of the correlation between the line 290 and the data points 282A-289D can reflect the accuracy of the measurement of the effective bandwidth (i.e., 1/slope of line 290). By way of example, a linear correlation coefficient of the line 290 can be used. The linear coefficient determines a variation of the 32 data points 282A-289D from the line 290. The linear correlation coefficient varies in a range between 0 and 1. A linear correlation coefficient of 1 means that all of the 32 data points 282A-289D fall on the line 290 and therefore the line 290 very accurately describes the measured effective bandwidth. A linear correlation coefficient of 0 means that there is no linear correlation between the data points 282A-289D and therefore the line 290 does not accurately describe the measured effective bandwidth.

A linear correlation coefficient measures how well a linear function explains the relationship between two sets of variables (i.e., the data packet sizes and the respective RTTs) and in effect measures how well the linear regression method works on the data set. It should be understood that the linear correlation coefficient is only an exemplary method of checking the accuracy of the measured effective bandwidth and that any suitable correlation method can be also used. One or more alternative methods can be used to determine the relationship between the minimum RTTs (or maximum RTTs or some other selection of the RTTs for each size of packets) and the packet sizes instead of using linear regression. A different measure of "fit" other than the linear correlation coefficient might also be used.

Another embodiment provides a method of minimizing the consumption of the effective bandwidth between two nodes by the application that is determining the effective bandwidth. This can be achieved by several methods including reducing the number of different packet sizes, changing the packet sizes, increasing the time delay between sending two packets or reducing the value of N. If for example the number of packet sizes is reduced, then the effective bandwidth measurements will usually be less accurate, unless N is also increased. If the time between sending packets is increased, then more time is required to complete the required N cycles.

In general, as bandwidth consumption is reduced (e.g., by increasing the time delay between sending packets), the time required to achieve an accurate effective bandwidth measurement is increased. However, the more time the algorithm needs to determine the effective bandwidth, the slower the algorithm will be in responding to dynamic bandwidth changes. Therefore, a trade-off has to be made between accuracy and bandwidth consumption as well as accuracy and responsiveness. To improve the bandwidth determination algorithm while not adversely affecting the bandwidth, it is often desirable to make the bandwidth determination algorithm itself adaptive to the bandwidth.

In one embodiment, when a remote distributed computing application starts up, it establishes communication between a host node and a client node through one or more channels. These channels could be based on a UDP connection, a TCP connection, or any other type of connection. To determine the effective bandwidth, a second communication channel can also be set up between the host node and the client node. The second channel should have an effective bandwidth that is similar to the effective bandwidth for any other channel(s) set up between the host node and the client node. Therefore, any bandwidth measured on this second channel should accurately reflect the bandwidth available for communication between the host node and the client node. It should be understood that the second channel is not required as the effective bandwidth can also be measured using Internet Control Message Protocol (ICMP) messages or by using the same channel as the application data.

As described above, the host node sends the client node packets of different sizes. The packets are sent at a set time interval (typically 2-500 msecs). Once the bandwidth algorithm has cycled through the different sizes of packets N times, the effective bandwidth can be determined such as described above using e.g., linear regression.

By way of example in a LAN-based remote distributed application, the time delay between sending packets could be 300 msecs and N could be 30. Choosing three different packet sizes of 128, 778 and 1428 Bytes, the bandwidth measurement requires a bandwidth of approximately 20 Kbps:

$$\frac{128 + 778 + 1428 \text{ Bytes}}{900 \text{ msecs}} =$$

$$\frac{2334 \text{ Bytes}}{900 \text{ msecs}} = \frac{2593.33 \text{ Bytes}}{\text{sec}} = 20746.67 \text{ bits/sec}$$

The effective bandwidth can be computed approximately every 27 seconds:

(number of packets)*(*Td*)*N=3*300 msecs*30=27 secs

Depending on the network conditions, it is possible that a prior choice of N is not the optimal N value. In networks where the RTT has little variation, a smaller N can provide an accurate effective bandwidth measurement. Conversely, in networks with wide variations in RTT, a larger N is needed to provide an accurate effective bandwidth measurement. As stated above, as N is increased, the more accurate the measurement, but also more time is needed to determine the effective bandwidth. Further, decreasing N can decrease the accuracy of the effective bandwidth determination.

The linear correlation coefficient or any other measure of "fit" of the packet sizes and a selected RTT for each packet size are used to verify that the determined functional relationship is sufficiently accurate. If the functional relationship is not sufficiently accurate, then N can be incrementally increased automatically, up to a pre-determined maximum N, when the computed effective bandwidth must be accepted. If a maximum N value is not adopted, then the bandwidth determination algorithm can eventually consume a significant portion of the effective bandwidth while attempting to quantify the effective bandwidth. Further, as N increases, the total time required to complete a bandwidth determination also increases. A virtually unlimited N can result in an excessively long time to complete a bandwidth determination, which is then not very useable.

By way of example, the cut-off for the linear correlation coefficient can be set to 0.95. If N is 10 and the linear correlation coefficient is determined to be less than 0.95, then N can be increased to 15. If, with N set to 15, the linear correlation coefficient is then determined to be equal to or greater than 0.95, then N set to 15 can be used for subsequent iterations. However, if, with N set to 15, the linear correlation coefficient is determined to still be less than 0.95, then N can be increased e.g., to a selected maximum value of 30. If, with N=30, linear correlation coefficient is determined to equal to or greater than 0.95, then N=30 can be used as the value for N for subsequent iterations. However, if, with N=30, the linear correlation coefficient is still determined to less than 0.95, then N=30 will nevertheless be used for subsequent iterations because to increase N still higher would increase the consumption of the bandwidth of the communication link being measured.

In a similar process, N can be decreased until a further decrease results in inaccurate bandwidth determination (i.e., the linear correlation coefficient becomes less than a desired value).

It is often advantageous to determine an approximate bandwidth of a connection between two nodes as soon as possible. In one embodiment, when a connection is first established, the first node can determine the start-up effective bandwidth using less than N cycles (e.g., K cycles where K<N). As described above, the linear correlation coefficient can then be used to determine if the determined start-up effective bandwidth is sufficiently accurate. However, once N cycles have been completed, the first node can then begin determining the effective bandwidth every N cycles again.

By way of example, a start-up value for K can be 2 (i.e. the start-up effective bandwidth computation is performed every other cycle). If three sizes of packets are used and the packets are sent in time delays of 300 msecs, then the first start-up effective bandwidth measurement could be completed after only 1.8 seconds as shown by the following:

(K)*(Td)*(Sp)

(2)*(300 msec)(3)=1.8 seconds where:

K is the number of cycles

Td is equal to the time delay between each packet

Sp is equal to the number of packet sizes used.

If the linear correlation coefficient is lower than the desired value, the first start-up effective bandwidth can be ignored and a second start-up effective bandwidth measurement can be determined after another two cycles.

Computing the bandwidth every N cycles can also cause slow responsiveness to dynamic changes in the bandwidth. The responsiveness can be improved by performing interim measurements of the effective bandwidth (e.g., every M cycles, where M<N). The interim effective bandwidth can be compared to the last effective bandwidth that used N cycles. The interim effective bandwidth will be less accurate than the effective bandwidth that used N cycles, and hence will most likely differ from the last N cycle effective bandwidth somewhat. If an interim effective bandwidth differs too much from the last N cycle effective bandwidth, then it can be assumed that the actual effective bandwidth has changed. "Too much" change can be defined as a percentage of the N cycle effective bandwidth or some other relationship to the N cycle effective bandwidth. The bandwidth measurement algorithm can then restart as described in the start-up effective bandwidth measurement variation or this interim effective bandwidth measurement can be used until N new cycles have been completed.

By way of example, consider the case in which the last N cycle effective bandwidth was 2970 kpbs and the maximum allowed divergence of the interim effective bandwidth is 20%. A new interim effective bandwidth measurement shows a bandwidth of 1200 kpbs. Since 1200 kpbs is not within 20% of 2970 kpbs (i.e., between 3564 kpbs (120% of 2970 kpbs) and 2376 kbps (80% of 2970 kpbs)). The interim effective bandwidth of 1200 kpbs indicates that the actual effective bandwidth has changed. Therefore, all of the RTTs recorded so far can be discarded and the interim effective bandwidth can be used until N new cycles have been completed. Alternatively, a start-up effective bandwidth as described above, can be determined and then used until N new cycles have been completed.

As described above in FIG. 2A, the effective bandwidth is determined every N cycles using the RTT data from N cycles where N has a constant value. However, as discussed above, the effective bandwidth can be determined with different numbers of cycles (e.g., start-up effective bandwidth and interim effective bandwidth). By way of example the effective bandwidth can be done every X cycles, using the data from the first N cycles. X can be greater than or less than N, however typically X would be less than N.

In one embodiment, at least a portion of the data from a previous N cycles can be reused. By way of example, as described above in FIG. 2A, the effective bandwidth uses the RTT data of cycles 1 to N. A modified effective bandwidth computation can occur in cycle N+X. The RTT data of cycles X to N+X is used to determine the modified effective bandwidth. In cycle N+2*X the RTT data of cycles 2*X to N+2*X can be used.

In yet another embodiment, the connection is set-up between the first node and the second node. Immediately following the initial connection set-up a time period is substantially dedicated to determine the effective bandwidth. In this initial connection phase, the effective bandwidth determination algorithm can use a majority of the available bandwidth. By way of example, the time interval between sending the packets can be reduced so as to approach zero delay. As a result, more packets can be sent in less time and an initial effective bandwidth can be determined faster. After the initial effective bandwidth is determined, the time delay between sending the packets can be increased.

Figure 4:
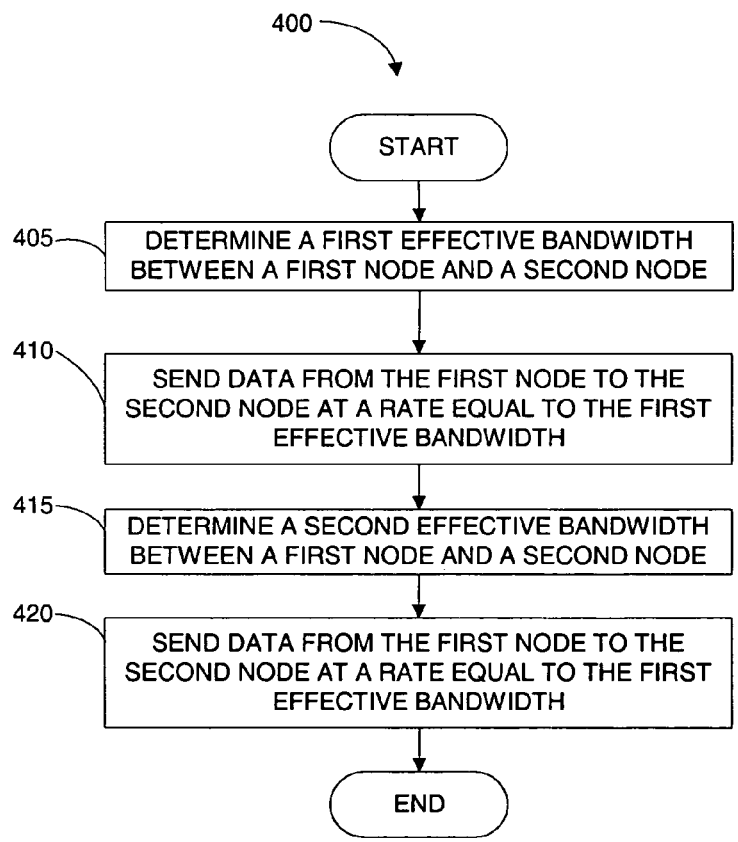
FIG. 4 is a flowchart of the method operations for transferring data across a communication network, in accordance with one embodiment of the present invention.

FIG. 4 is a flowchart of the method operations 400 for transferring data across a communication network, in accordance with one embodiment of the present invention. In an operation 405, a current effective bandwidth between a first node and a second node is measured and defined as a first effective bandwidth.

In an operation 410, data is sent from the first node to the second node at a rate equal to the first effective bandwidth. As dynamic conditions of the communication network can change, the current effective bandwidth can change.

In an operation 415, a change in the current effective bandwidth is detected and a second effective bandwidth is determined. The second effective bandwidth is different from (i.e., greater than or less than) the first second effective bandwidth.

In an operation 420, data can be sent at a rate equal to the second effective bandwidth. One or more aspects of an application that is sending data can be changed to use the second effective bandwidth.

By way of example, an application operating on a first node of a communication network can send data at the first effective bandwidth. When the dynamic conditions of the communication network change, and the current effective bandwidth is determined to be different from the first effective bandwidth, the second effective bandwidth can be communicated to the application. The application can then adjust operations to send the data to the second node at a rate equal to the second effective bandwidth.

As used herein in connection with the description of the invention, the term "about" means +/−10%. By way of example, the phrase "about 250 msec" indicates a range of between 225 and 275 msec. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in any of the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of determining effective bandwidth in a communication network comprising:
   selecting a first packet size;
   sending a first packet having the first packet size from a first node to a second node, the first node and the second node being included in the communication network;
   receiving a confirmation that the first packet was received in the second node;
   recording a transfer time of the first packet;
   selecting a second packet size;
   sending a second packet having the second packet size from the first node to the second node;
   receiving a confirmation that the second packet was received in the second node;
   recording a transfer time of the second packet;
   calculating an effective bandwidth between the first node and the second node including:
      forming a line defined by a selected transfer time for each packet size; and
      determining a slope of the line, wherein the effective bandwidth is equal to an inverse of the slope of the line; and
   outputting the effective bandwidth.

2. The method of claim 1 further comprising determining if additional packet sizes are to be sent, if additional packet sizes are to be sent, then:
   selecting a subsequent packet size;
   sending a subsequent packet having the subsequent packet size from the first node to the second node;
   receiving a confirmation that the subsequent packet was received in the second node; and
   recording a transfer time of the subsequent packet.

3. The method of claim 2, wherein calculating the effective bandwidth between the first node and the second node includes determining if an additional cycle of selecting packet sizes and sending packets of the selected size are required.

4. The method of claim 3, wherein the cycle includes:
   selecting the first packet size;
   sending a third packet having the first size from the first node to the second node;
   receiving a confirmation that the third packet was received in the second node;
   recording a transfer time of the third packet; and
   determining if additional packet sizes are to be sent.

5. The method of claim 3, wherein a number (N) of cycles can be constant.

6. The method of claim 3, wherein a number (N) of cycles can vary.

7. The method of claim 6, wherein N can be a small value for a start-up effective bandwidth and N can be increased to a larger value.

8. The method of claim 6, wherein N can be reduced until a correlation is less than a preselected correlation coefficient.

9. The method of claim 6, wherein N can be increased until a correlation is equal to or greater than a preselected correlation coefficient.

10. The method of claim 1, wherein the line is determined using a linear least squares progression.

11. The method of claim 1, wherein determining the accuracy of the line includes determining if a correlation between the selected packet sizes and the recorded transfer times corresponding to each of the selected packet sizes is equal to or greater than a preselected correlation level.

12. The method of claim 11, wherein if the correlation between the selected packet sizes and the recorded transfer times corresponding to each of the selected packet sizes is less than the preselected correlation level, then an additional cycle is needed.

13. The method of claim 11, wherein if the correlation between the selected packet sizes and the recorded transfer times corresponding to each of the selected packet sizes is less than the preselected correlation level, then the effective bandwidth measurement is restarted.

14. The method of claim 3, further comprising repeating the method of determining effective bandwidth.

15. The method of claim 1, wherein outputting the effective bandwidth includes receiving the effective bandwidth in an application on a third node and the wherein the application modifies at least one operation according to the effective bandwidth.

16. An optimized method of determining effective bandwidth in a communication network comprising:
   selecting at least two packet sizes from a plurality of packet sizes, wherein selecting each one of the at least two packet sizes includes:
      sending a packet of the selected size from a first node to a second node, the communication network including the first node and the second node;
      receiving a confirmation that the sent packet was received in the second node;
      recording a transfer time of the sent packet;
      determining if additional packet sizes are to be sent and if additional packet sizes are to be sent, then selecting a subsequent packet size;
      incrementing a cycle count; and
   if additional packet sizes are not to be sent, determining if the cycle count is equal to N, if the cycle count is not equal to N then select the first packet size;
   if the cycle count is equal to N, then calculating the effective bandwidth between the first node and the second node; and
   determining an optimum N value.

17. The method of claim 16, wherein determining the optimum N value includes:
   determining if the transfer time has a correlation equal to a preselected level, if the transfer time has a correlation equal to the preselected level then decrementing N;
   if the transfer time has a correlation less than the preselected level then incrementing N; and
   selecting the first packet size.

18. The method of claim 16, wherein determining the optimum N value includes outputting a minimum N value where the transfer time has a correlation equal to a preselected level.

19. A method of transferring data across a communication network comprising:
   measuring a current effective bandwidth between a first node and a second node in the communication network, the current effective bandwidth being equal to a first effective bandwidth including:
  selecting a first packet size;
  sending a first packet having the first packet size from a first node to a second node;
  receiving a confirmation that the first packet was received in the second node;
  recording a transfer time of the first packet;
  selecting a second packet size;
  sending a second packet having the second packet size from the first node to the second node;
  receiving a confirmation that the second packet was received in the second node;
  recording a transfer time of the second packet;
  calculating the first effective bandwidth between the first node and the second node including:
    forming a line defined by a selected transfer time for each packet size; and
    determining a slope of the line, wherein the effective bandwidth is equal to an inverse of the slope of the line;
sending data at a rate substantially equal to the first effective bandwidth;
determining that the current effective bandwidth has changed and is equal to a second effective bandwidth;
sending data at a rate substantially equal to the second effective bandwidth.

20. The method of claim 19, wherein sending data at a rate substantially equal to the second effective bandwidth includes changing at least one aspect of an application that is sending data.

21. A system for determining effective bandwidth comprising:
  a first node including:
    computer readable code on a computer readable medium for selecting a first packet size;
    computer readable code on a computer readable medium for sending a first packet of the selected size from the first node to a second node,
    the second node being coupled to the first node by a communication network;
    computer readable code on a computer readable medium for receiving a confirmation that the first packet was received in the second node;
    computer readable code on a computer readable medium for recording a transfer time of the first packet;
    computer readable code on a computer readable medium for selecting a second packet size;
    computer readable code on a computer readable medium for sending a second packet of the selected size from the first node to a second node, the second node being coupled to the first node by a communication network;
    computer readable code on a computer readable medium for receiving a confirmation that the second packet was received in the second node;
    computer readable code on a computer readable medium for recording a transfer time of the second packet;
    computer readable code on a computer readable medium for calculating an effective bandwidth between the first node and the second node including:
      computer readable code on a computer readable medium for forming a line defined by a selected transfer time for each packet size; and
      computer readable code on a computer readable medium for determining a slope of the line, wherein the effective bandwidth is equal to an inverse of the slope of the line; and
    computer readable code on a computer readable medium for outputting the effective bandwidth.

* * * * *